United States Patent
Kum et al.

(10) Patent No.: US 11,285,705 B2
(45) Date of Patent: Mar. 29, 2022

(54) FILM LAMINATE AND WINDOW PRODUCT COMPRISING SAME

(71) Applicant: Samsung Electronics Co., Ltd., Suwon-si (KR)

(72) Inventors: Junsig Kum, Yongin-si (KR); Hyunjin Kim, Seoul (KR); Yoongeon Kim, Suwon-si (KR); Taesik Yang, Suwon-si (KR); Youngju Lee, Seoul (KR); Jungyub Lee, Yongin-si (KR); Dohyuk Ha, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 16/342,756

(22) PCT Filed: Oct. 18, 2017

(86) PCT No.: PCT/KR2017/011543
§ 371 (c)(1),
(2) Date: Apr. 17, 2019

(87) PCT Pub. No.: WO2018/074847
PCT Pub. Date: Apr. 26, 2018

(65) Prior Publication Data
US 2020/0048958 A1 Feb. 13, 2020

(30) Foreign Application Priority Data
Oct. 18, 2016 (KR) .......................... 10-2016-0134801

(51) Int. Cl.
*B32B 3/00* (2006.01)
*B32B 27/06* (2006.01)
(Continued)

(52) U.S. Cl.
CPC ................ *B32B 27/06* (2013.01); *B32B 7/12* (2013.01); *B32B 17/1022* (2013.01);
(Continued)

(58) Field of Classification Search
None
See application file for complete search history.

(56) References Cited

U.S. PATENT DOCUMENTS 5,364,685 A * 11/1994 Nakashima ....... B32B 17/10036
428/155
6,356,236 B1 * 3/2002 Maeuser ................. B32B 17/10
343/713

(Continued)

FOREIGN PATENT DOCUMENTS

| CN | 202503691 U | 10/2012 |
| CN | 103262339 A | 8/2013 |

(Continued)

OTHER PUBLICATIONS

Tuncer et al., "Dielectric properties of various nanocomposite materials", 2010, Advances in Cryogenic Engineering: Transactions of the Cryogenic Engineering Materials Converence—ICMC, vol. 56, pp. 63-67 (Year: 2010).*

(Continued)

*Primary Examiner* — Seth Dumbris
(74) *Attorney, Agent, or Firm* — Jefferson IP Law, LLP

(57) ABSTRACT

A window product according to various embodiments of the present invention comprises: a window; and a film made of at least one insulation material and bonded to one side of the window, wherein the permittivity of the insulation material constituting the film is lower than the permittivity of the window and is higher than the permittivity of air, and the film may be a film for reducing loss of radio wave trans- (Continued)

missivity of the window when attached to the window. Other various embodiments are also possible.

15 Claims, 27 Drawing Sheets

(51) Int. Cl.
  *B32B 7/12* (2006.01)
  *B32B 17/10* (2006.01)
  *E06B 9/24* (2006.01)
(52) U.S. Cl.
  CPC .. *B32B 17/10055* (2013.01); *B32B 17/10779* (2013.01); *E06B 9/24* (2013.01); *B32B 2255/10* (2013.01); *B32B 2255/205* (2013.01); *B32B 2307/206* (2013.01); *B32B 2457/00* (2013.01); *E06B 2009/247* (2013.01); *E06B 2009/2417* (2013.01); *Y10T 428/24917* (2015.01)

(56) References Cited

U.S. PATENT DOCUMENTS

| | | | |
|---|---|---|---|
| 6,860,081 B2* | 3/2005 | Walton | E06B 7/28 |
| | | | 52/204.1 |
| 6,891,517 B2* | 5/2005 | Voeltzel | B32B 17/10036 |
| | | | 343/909 |
| 7,030,828 B2 | 4/2006 | Kato et al. | |
| 7,745,009 B2* | 6/2010 | Decroupet | C03C 17/3652 |
| | | | 428/432 |
| 8,927,069 B1 | 1/2015 | Estinto et al. | |
| 9,297,938 B2* | 3/2016 | Le | G02B 5/208 |
| 2003/0080909 A1* | 5/2003 | Voeltzel | H01Q 15/0013 |
| | | | 343/713 |
| 2006/0152421 A1* | 7/2006 | Baranski | B32B 17/10036 |
| | | | 343/713 |
| 2010/0255238 A1* | 10/2010 | Derda | B32B 17/10183 |
| | | | 428/38 |
| 2014/0015716 A1 | 1/2014 | Villarroel et al. | |
| 2014/0361945 A1 | 12/2014 | Misra et al. | |
| 2015/0093466 A1 | 4/2015 | Estinto et al. | |
| 2015/0093554 A1 | 4/2015 | Estinto et al. | |
| 2015/0229030 A1* | 8/2015 | Dai | H01Q 15/0013 |
| | | | 219/203 |
| 2015/0343884 A1* | 12/2015 | Rousselet | B32B 7/12 |
| | | | 359/360 |
| 2016/0009592 A1* | 1/2016 | Arslan | B23K 26/0006 |
| | | | 428/209 |
| 2016/0286609 A1* | 9/2016 | Paulus | C03C 17/00 |

FOREIGN PATENT DOCUMENTS

| | | |
|---|---|---|
| DE | 195 08 042 A1 | 10/1995 |
| JP | H01-264301 A | 10/1989 |
| JP | 2001-196826 A | 7/2001 |
| JP | 2009-267992 A | 11/2009 |
| JP | 2011-044980 A | 3/2011 |
| JP | 2012-126578 A | 7/2012 |
| KR | 10-2007-0010936 A | 1/2007 |
| KR | 10-2016-0009593 A | 1/2016 |
| WO | 88/01440 A1 | 2/1988 |
| WO | 2015/025963 A1 | 2/2015 |

OTHER PUBLICATIONS

Mats Gustafsson et al., Design of Frequency Selective Windows for Improved Indoor Outdoor Communication, IEEE Transactions on Antennas and Propagation, vol. 54, No. 6, Jun. 2006.
M. Beruete et al., Enhanced Microwave Transmission and Beaming Using a Subwavelength Slot in Corrugated Plate, IEEE Antennas and Wireless Propagation Letters, vol. 3, Mar. 2004.
Peter A.R. Ade et al., A Review of Metal Mesh Filters, Cardiff University—Cardiff, 5 The Parade, CF24 3YB Cardiff, UK, Proc. of SPIE vol. 6275, 2006.
A. A. Oliner et al., Leaky Surface-Plasmon Theory for Dramatically Enhanced Transmission through a Subwavelength Aperture, Part 1: Basic Features, Polytechnic University, Brooklyn, NY, University of Houston, TX, IEEE 2003.
European Search Report dated Sep. 18, 2019, issued in European Patent Application No. 17861876.5.
Chinese Office Action dated Oct. 16, 2020, issued in Chinese Application No. 201780063218.3.
Indian Examination Report dated Dec. 30, 2020, issued in Indian Application No. 201917015528.

* cited by examiner

FILM LAMINATE AND WINDOW PRODUCT COMPRISING SAME

TECHNICAL FIELD

The present embodiment relates to a film laminate and a window product including the film laminate.

BACKGROUND ART

With spread of a portable electronic device and commercialization of Internet of things (IoT) technology, a demand for wireless communication increases; thus, more advanced mobile communication technology may have been studied. Recently, a research of 5 generation (5G) wireless communication has been actively performed, and in 5G wireless communication, in order to increase a data transmission speed, a research has been performed to use a band higher than a frequency band used in conventional wireless communication such as 28 GHz band. In this way, when a high frequency band is used, there is a merit in a transmission speed, but because a propagation loss is large, a method of preventing a propagation loss according to long distance transmission has been variously studied.

An antenna of a base station used for wireless communication is generally disposed outside a room in consideration of wide coverage and a path loss, but a customer premises equipment (hereinafter, CPE) that receives a radio wave from the antenna of the base station may be disposed in the room in a management aspect. As described above, when a higher frequency band is used, a propagation loss is large, and in particular, in order to transmit radio waves output from the base station to the indoor CPE, the radio waves should pass through a wall or a window, and in this case, a more propagation loss may occur. In particular, in recent years, in order to improve a heat insulating performance of a window, use of low-emissivity glass including a transparent metal coating layer increases, and metal coating of the low-emissivity glass may be a major factor that disturbs passage of radio waves.

DISCLOSURE OF INVENTION

Technical Problem

The present invention provides a film laminate for improving transmission of radio waves through a glass window, a window product to which the film laminate is attached, and a window product in which an electrode pattern is formed.

Solution to Problem

In accordance with an aspect of the present invention, a window product includes a window; and a film made of at least one insulation material and bonded to one surface of the window, wherein permittivity of the insulation material constituting the film is lower than that of the window and is higher than that of air, and the film is configured to reduce a transmission loss of radio waves in the window when the film is attached to the window.

In accordance with another aspect of the present invention, a window product includes an insulating layer made of at least one insulation material; and a metal coating layer bonded to one surface of the insulating layer, wherein at least a partial region of the metal coating layer is removed to reduce a transmission loss of radio waves.

In accordance with another aspect of the present invention, a film includes an insulating layer made of an insulation material; an electrode layer bonded to one surface of the insulating layer and having an electrode pattern made of an electrode material in at least a partial region of one surface different from a surface bonded to the insulating layer, wherein the electrode pattern of the electrode layer is formed to reduce a transmission loss of radio waves in the window when the film is attached to the window.

In accordance with another aspect of the present invention, a window product includes an insulating layer made of an insulation material; at least one electrode layer bonded to one surface of the insulating layer and having an electrode pattern made of an electrode material in at least a partial region of one surface different from a surface bonded to the insulating layer; and at least one window, wherein the electrode pattern of the electrode layer is formed to reduce a transmission loss of radio waves in the at least one window.

Advantageous Effects of Invention

According to various embodiments of the present invention, a film laminate for improving transmission of a radio wave through a glass window, a window product to which the film laminate is attached, and a window product in which an electrode pattern is formed can be provided.

BEST MODE FOR CARRYING OUT THE INVENTION

Hereinafter, various exemplary embodiments of this document will be described in detail with reference to the accompanying drawings. It should be understood that embodiments and terms used in the embodiments do not limit technology described in this document to a specific embodiment and include various changes, equivalents, and/or replacements of a corresponding embodiment. The same reference numbers are used throughout the drawings to refer to the same or like parts. Unless the context otherwise clearly indicates, words used in the singular include the plural, and the plural includes the singular. In this document, an expression such as "A or B" and "at least one of A or/and B" may include all possible combinations of the together listed items. An expression such as "first" and "second" used in this document may indicate corresponding constituent elements regardless of order and/or importance, and such an expression is used for distinguishing a constituent element from another constituent element and does not limit corresponding constituent elements. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

In this document, "configured to (or set to)" may be interchangeably used in hardware and software with, for example, "appropriate to", "having a capability to", "changed to", "made to", "capable of", or "designed to" according to a situation. In any situation, an expression "device configured to do" may mean that the device "can do" together with another device or component. For example, a "processor configured to (or set to) perform phrases A, B, and C" may mean an exclusive processor (e.g., an embedded processor) for performing a corresponding operation or a generic-purpose processor (e.g., CPU or application processor) that can perform a corresponding operation by executing at least one software program stored at a memory device.

Figure 1A:
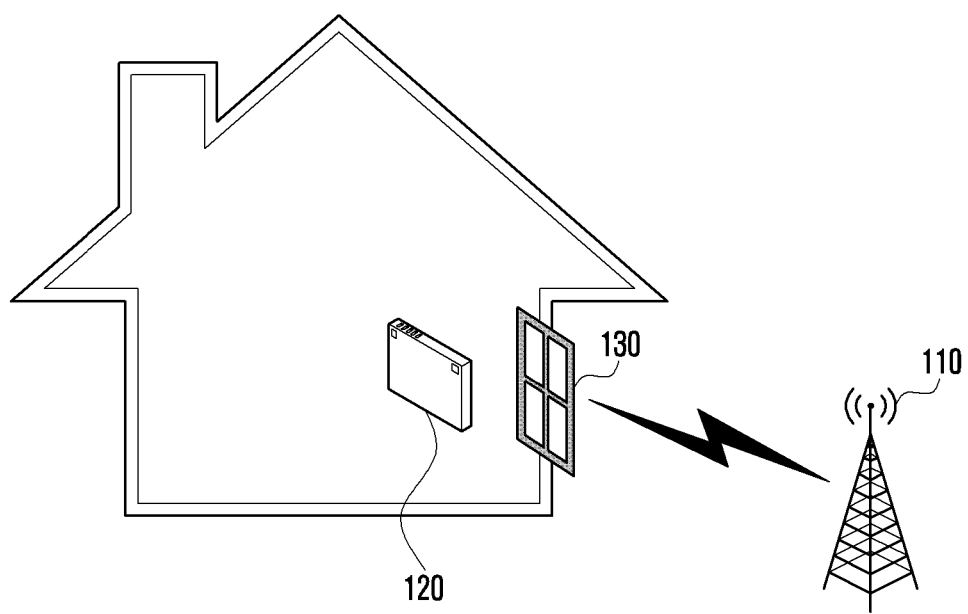
FIG. 1A illustrates a base station, CPE, and window.

FIG. 1A illustrates a base station, customer premises equipment (CPE), and window.

A base station 110 outputs radio waves through an antenna, and the radio wave output from the antenna of the base station 110 may be transmitted to the CPE 120. Conversely, the base station 110 may receive radio waves output by the CPE 120, but in the present specification, a case is exemplified in which the base station 110 is the transmission side and in which the CPE 120 is the reception side.

The CPE 120 is a terminal device connected to the network and may include, for example, a modem, a set-top box, and a terminal. The CPE 120 may be provided inside a room, and in particular, the CPE 120 may be disposed in the vicinity of a window 130.

A wireless communication frequency band of the base station 110 and the CPE 120 may be a superhigh frequency (e.g., 28 GHz) band. As is known, when a high frequency band is used in the superhigh frequency, there is a merit in a transfer rate, but a severe propagation loss is inevitable. In FIG. 1A, because the CPE 120 exists inside the room, radio waves output from the antenna of the base station 110 may be transmitted to the CPE 120 inside the room through a wall or the window 130, but when radio waves pass through the wall or the window 130, a propagation loss may occur.

The window 130 may include low-emissivity glass. The low-emissivity glass is glass that coats a special metal film having high infrared reflectance in the inside of regular glass and is used for improving a heat insulating performance. The low-emissivity glass may have a form overlapped with a plurality of layers formed with, for example, titanium dioxide, zinc stannate, zinc oxide, and silver.

Because such low-emissivity glass has an excellent heat insulating performance, the low-emissivity glass is much used, but transmission of a radio wave may be disturbed because of a metal coating layer. In particular, in a superhigh frequency band, reflection and interference of a radio wave more severely occurs; thus, a method for further improved transmission of the radio wave is required.

FIG. 1A illustrates an example of an actual use form of various embodiments of the present invention, and a configuration and an actual use form of the base station 110 and the CPE 120 are not limited thereto. That is, various embodiments of the present invention relate to a film laminate for attaching to a window or a window product that may improve transmission of radio waves transmitted from an antenna of a first device (e.g., the base station 110) to an antenna of a second device (e.g., the CPE 120), and the type and an actual use form of the first device and the second device are not limited.

Further, in the present specification, low-emissivity glass is exemplified, but in at least some of various embodiments of the present invention, even in regular glass that does not include a metal coating layer other than low-emissivity glass, transmittance of radio waves can be enhanced.

Figure 1B:
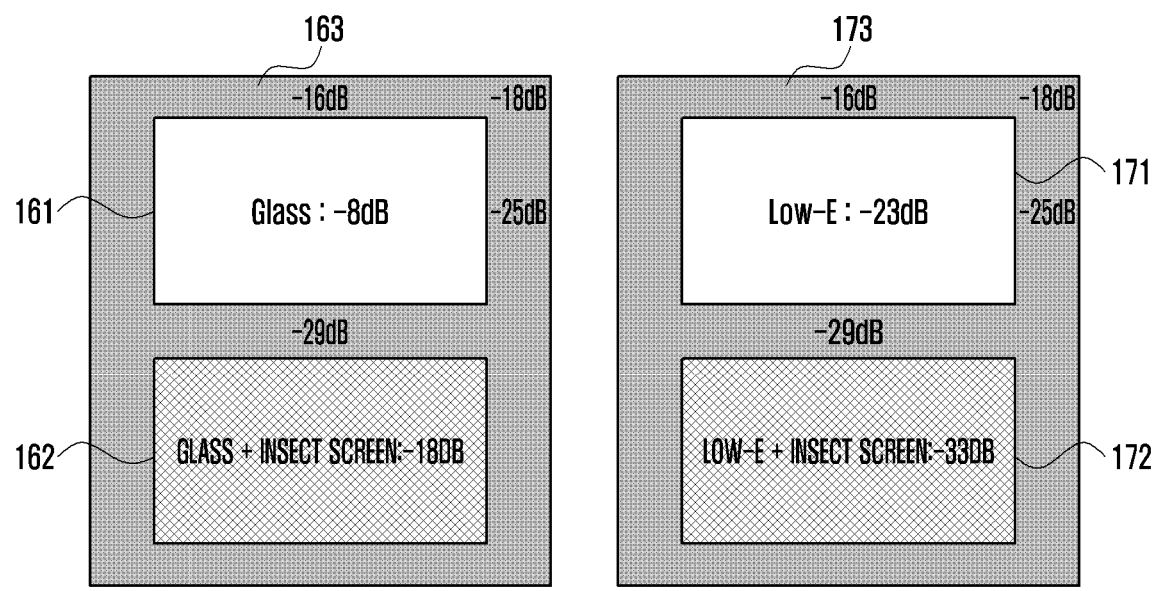
FIG. 1B illustrates a propagation loss in windows.

FIG. 1B illustrates a propagation loss in windows.

In FIG. 1B, the left side illustrates a window using regular glass, and the right side illustrates a window using low-emissivity, and a propagation loss value to be described below is an experimentally measured example.

First, windows (or window frame) enclosing glass (regular glass or low-emissivity glass) are made of a known plastic material and have a thick thickness. Therefore, when radio waves pass through a window, it was measured that a propagation loss of −16 dB, −18 dB, −25 dB, and −29 dB occurs on a position basis, as illustrated in FIG. 1B.

Further, with reference to a left window of FIG. 1B, it was determined that in regular glass 211 that does not include a metal coating layer, a propagation loss of −8 dB has occurred, and when regular glass and an insect screen of a metal material are simultaneously used 212, a propagation loss of −18 dB has occurred. With reference to a right window of FIG. 1B, it was determined that in low-emissivity glass 221, a propagation loss of −23 dB has occurred, and when low-emissivity glass and an insect screen of a metal material are simultaneously used 222, a propagation loss of −33 dB has occurred.

According to such an experimental result, because windows have a large propagation loss value by an influence of a thickness and material thereof, it is difficult to use the windows for wireless communication, and a method of increasing a passing rate of radio waves passing through glass (regular glass or low-emissivity glass) is required. The present invention includes a first embodiment of attaching a film laminate made of an insulation material to the window, a second embodiment of attaching a film laminate in which an electrode pattern is formed to the window, and a third embodiment of forming an electrode pattern by etching one region of the window and hereinafter, the first embodiment to the third embodiment of the present invention will be described in detail with reference to FIGS. 2 to 12.

Figure 2A:
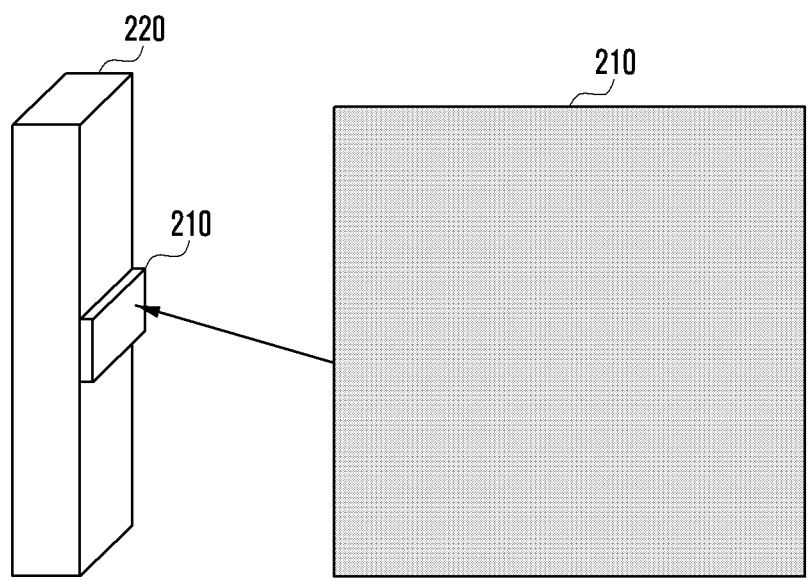
FIGS. 2A and 2B illustrate a window and a film laminate attached to the window according to a first embodiment.
Figure 2B:
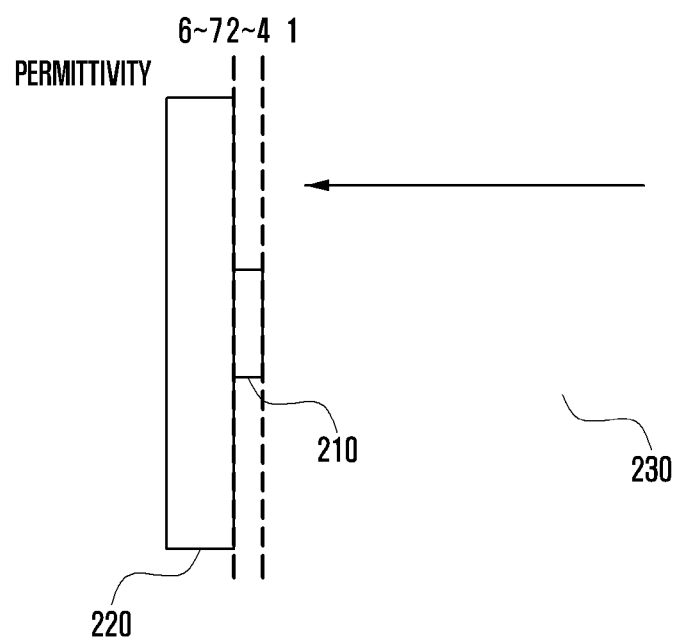

FIGS. 2A and 2B illustrate a window and a film laminate attached to the window according to the first embodiment.

In the first embodiment of the present invention, by attaching a film laminate 210 made of an insulation material to a window 220 made of a regular glass material, reflection of radio waves passing through the window from the outside is reduced.

According to the first embodiment, the film laminate 210 may be made of at least one insulation material and be bonded to one surface of the window 220. When the film laminate 210 is attached to the window 220, the film laminate 210 reduces a transmission loss of radio waves in the window 220.

According to the present embodiment, the window 220 may be regular glass that does not include a metal material. As is known, permittivity of a window made of glass may be about 6 F/m to 7 F/m, and permittivity of air may be about 1 F/m. Such a permittivity difference increases reflectivity of radio waves output from the base station and that passes through the window 220 and this may be a factor that disturbs radio wave reception of the CPE positioned inside a room.

Therefore, in the first embodiment, in order to reduce reflectance due to the permittivity difference between air 230 and the window 220, permittivity of the film laminate 210 may be lower than that of the window 220 and higher than that of the air 230. For example, permittivity of the film laminate 210 may be 2 F/m to 4 F/m.

According to an embodiment, the film laminate 210 may be formed with a plurality of film layers, and each film layer may have different permittivity. In this case, permittivity of each film layer may be lower than that of the window 220 and higher than that of the air 230, and each film layer may be attached close to the window in high permittivity order.

According to an embodiment, when the film laminate 210 is attached to the window 220, a thickness of the film laminate 210 may be determined so that an entire thickness thereof is proportional to a wavelength of radio waves, and the thickness of the film laminate 210 may be determined in consideration of a thickness of the window 220 and a frequency thickness of the radio waves.

Hereinafter, a second embodiment of the present invention will be described with reference to FIGS. 3 to 10. In the second embodiment, by attaching a film laminate including a patterned electrode layer to a window made of regular glass or low-emissivity glass, a phase of radio waves is changed; thus, a transmission loss of a desired direction is reduced. In the present invention, the window product may be attached to each or both of the film laminate according to the first embodiment and the film laminate (210 of FIG. 2A) according to the second embodiment. For example, the film laminate having an electrode pattern according to the second embodiment may be attached to the window, and a film laminate made of only an insulation material according to the first embodiment may be attached thereon. In this case, both effects of reduction of glass reflection intended in the first embodiment and a phase change of radio waves intended in the second embodiment can be achieved.

Figure 3A:
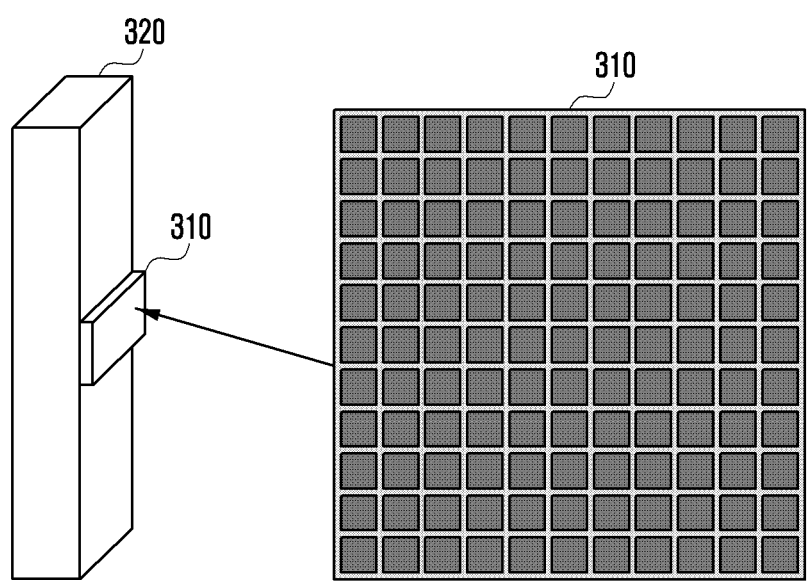
FIGS. 3A and 3B illustrate a window and a film laminate attached to the window according to a second embodiment.
Figure 3B:
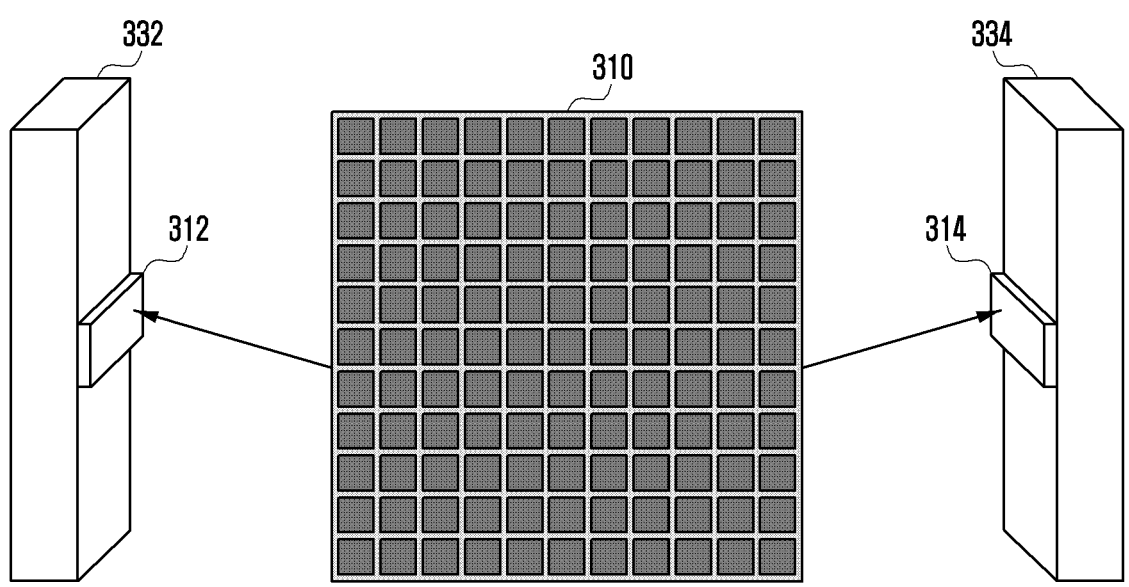

FIGS. 3A and 3B illustrate a window and a film laminate attached to the window according to a second embodiment. According to various embodiments, a window 320 may be made of regular glass or may be made of low-emissivity glass including a metal coating layer.

A film laminate 310 may include an insulating layer and an electrode layer. A size of the film laminate 310 is not limited, but in consideration of at least a distance to the CPE, when radio waves reach the CPE through the window 320 from the outside, the size of the film laminate 310 may be equal to or greater than a size of a region through which radio waves may pass. As illustrated in FIG. 3A, one surface of the insulating layer may be attached to the window 320 through an adhesive.

A propagation loss may occur by reflection inside glass according to physical characteristics, and a propagation loss value may be reduced by attachment of the film laminate 310.

According to various embodiments, duplex windows 332 and 334 may be used, and a plurality of film laminates 312 and 314 may be attached to the respective windows 332 and 334 constituting the duplex windows 332 and 334. An electrode pattern of the film laminates 312 and 314 attached to the respective windows 332 and 334 may be the same.

In the duplex windows 332 and 334, because permittivity of glass is high, reflection occurs, and destructive interference occurs by a signal reflected again from the inside of the duplex windows 332 and 334, and when an antenna of the CPE is positioned close to the windows 332 and 334, a performance may be deteriorated by reflected waves. According to various embodiments of the present invention, when the film laminates 312 and 314 are attached to the duplex windows 332 and 334, respectively, the above illustrated causes are reduced; thus, a propagation loss value may be reduced.

Figure 4A:
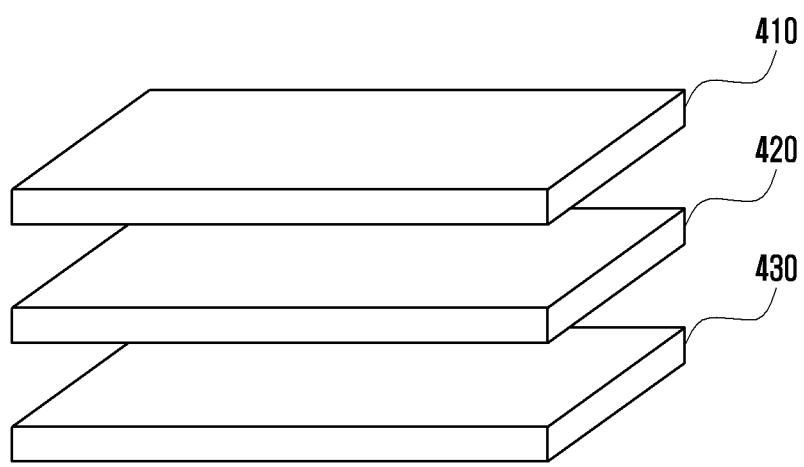
FIGS. 4A and 4B illustrate a film laminate according to a second embodiment.
Figure 4B:
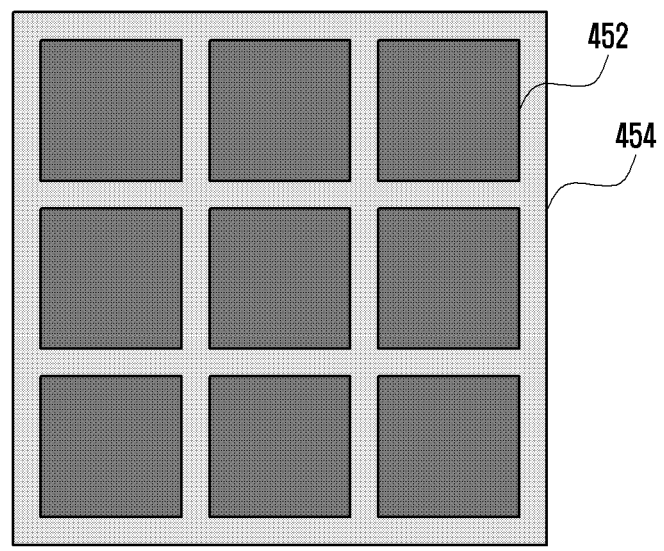

FIGS. 4A and 4B illustrate a film laminate according to a second embodiment.

As illustrated in FIG. 4A, the film laminate may include an electrode layer 410, insulating layer 420, and adhesive layer 430.

The insulating layer 420 may be made of an insulation material, for example, a polyethylene terephthalate (PET) film. The insulation material constituting the insulating layer 420 is not limited to PET, and at least one composite fiber material having a transparent material, for example, having transparency of 80% or more may be used. The insulating layer 420 may be formed in a flat surface and have a thickness of 125 to 200 µm. According to an embodiment, an insulation material constituting the insulating layer 420 may use an opaque material (e.g., transparency of less than 80%). In this case, because view to the outside is blocked, the insulation material may be used for the purpose of privacy.

The electrode layer 410 may be bonded to one surface of the insulating layer 420. In the electrode layer 410, in at least a partial region of one surface different from a surface bonded to the insulating layer 420, an electrode pattern made of an electrode material may be formed. A thickness of the electrode pattern may be 8 to 20 µm, and a thickness of the electrode pattern of the electrode layer may be determined according to a thickness of the window to which the film laminate is attached.

An electrode material used for the electrode pattern may include an electrode material of at least one metal or non-metal. The electrode material may include, for example, at least one of indium tin oxide (ITO), Ag, and carbon nanotube (CNT), but the present invention is not limited thereto and a transparent material, for example, a material having at least one conductivity having transparency of 80% or more may be used. Accordingly, even if the film laminate is attached to the window, blocking of visible light may be minimized; thus, a function of an existing window may be maintained to the maximum. According to an embodiment, unlike described above, the electrode pattern may include various electrode materials of an opaque material.

At other surface of the insulating layer 420, the adhesive layer 430 for attachment to the window may be provided.

FIG. 4B illustrates an electrode layer when viewed from a front surface.

An electrode pattern formed in the electrode layer may include a plurality of protruding regions 452 and a slot region 454 provided between the plurality of protruding regions 452. The protruding region 452 is a region protruded by the electrode material. The slot region 454 may be made of an insulation material or may be a region in which an electrode material is removed, and a plurality of protruding regions 452 physically separated with a slot interposed therebetween may be electrically separated.

A thickness (a length of a direction vertical to a surface to which each layer is attached) of the protruding region 452 of the electrode pattern may depend on a thickness of the window to which the film laminate is attached. As is known, when radio waves pass through the window, if the thickness of the window is $n\lambda/2$ ($\lambda$ is a wavelength of radio waves and n is a random integer), a reflection amount (or transmission loss) of the radio waves may be minimized. For example, a wavelength of radio waves having a frequency band of 28 GHz is about 3.57*10-11, and when the wavelength has a thickness of an integral multiple, transmittance of the radio waves may be maximized, but because a thickness of regular glass is not proportionally thereto, a transmission loss may occur. Accordingly, when the film laminate is attached to the window, the thickness of the protruding region 452 of the electrode pattern may be determined so that an entire thickness of the film laminate is proportional to a wavelength of the radio wave, and the thickness of the protruding region may be determined in consideration of a thickness of the window, a frequency of a radio wave, and a thickness of the insulating layer 420.

Figure 5A:
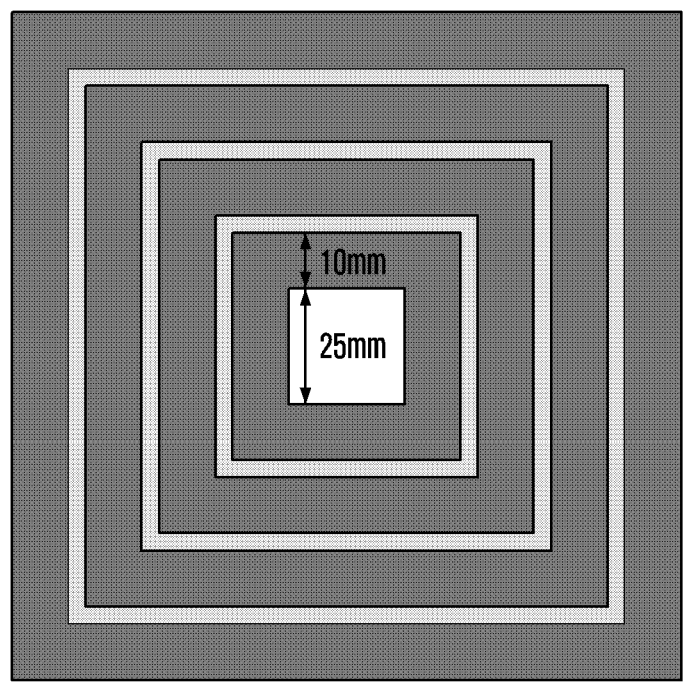
FIGS. 5A and 5B illustrate transmittance according to an electrode pattern of a film laminate according to a second embodiment.
Figure 5B:
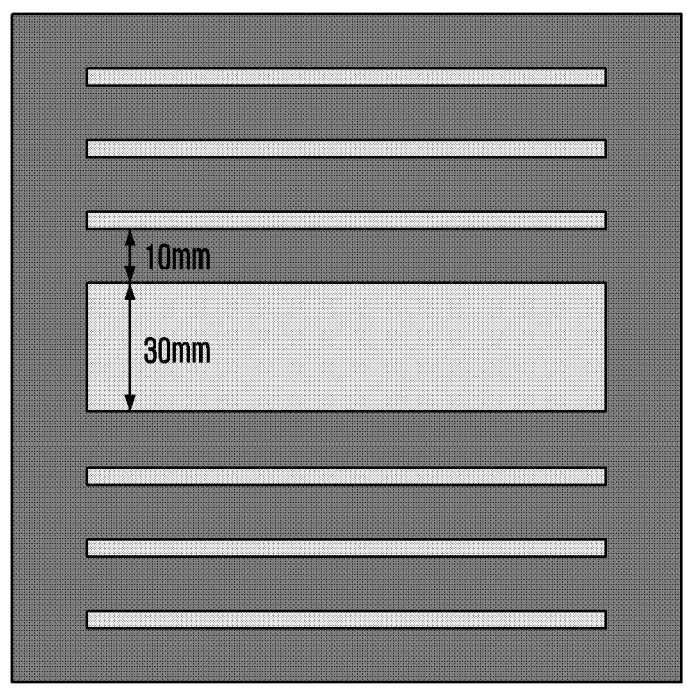

FIGS. 5A and 5B illustrate transmittance according to an electrode pattern of a film laminate according to a second embodiment.

According to various embodiments, an electrode pattern formed in a film laminate may be a pattern radiated in a rectangular form based on the center, as illustrated in FIG. 5A or may have a form that vertically or horizontally forms a line, as illustrated in FIG. 5B

In a film laminate having a form of FIG. 5A, an improving effect of a max gain may be high (in experimental results, about 3.54 dB was improved from 3.7 dB to 7.24 dB), and a beam width (or coverage) may be reduced. Alternatively, in a film laminate having a form of FIG. 5B, an improving effect of a max gain may be relatively low (in experimental results, about 0.7 dB was improved), but an improving effect of a beam width may be further excellent.

Therefore, a film laminate according to various embodiments may select any one of a radiated form of FIG. 5A and a line form of FIG. 5B or may form an electrode pattern by combining the radiated form and the line form in consideration of an actual use environment.

Figure 6A:
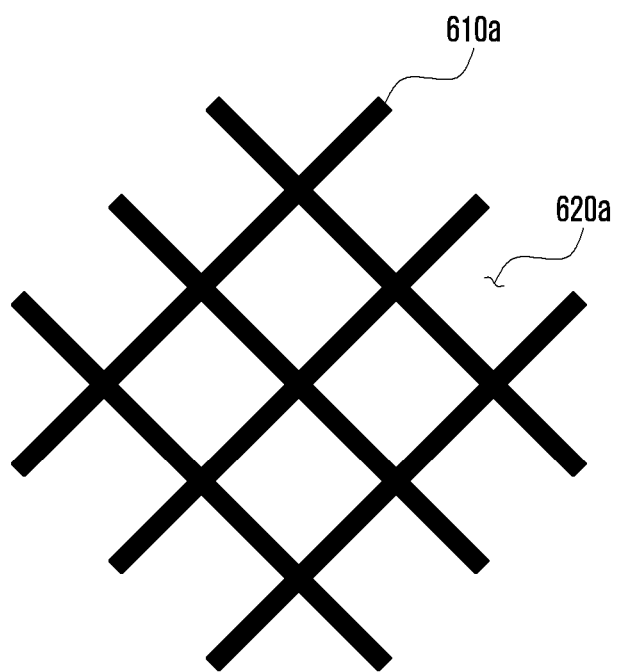
FIGS. 6A to 6C illustrate available forms of an electrode pattern formed in an insulating layer according to a second embodiment.
Figure 6B:
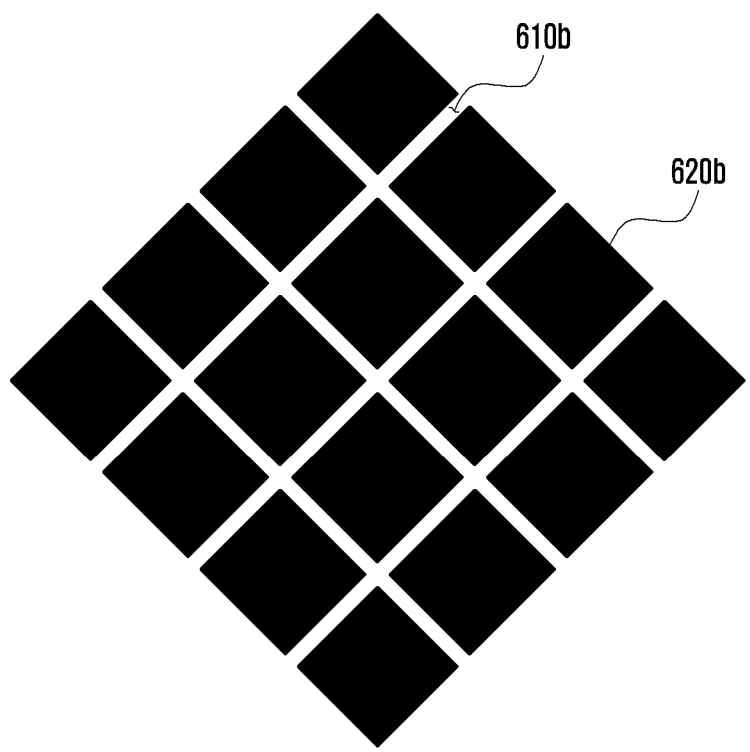
Figure 6C:
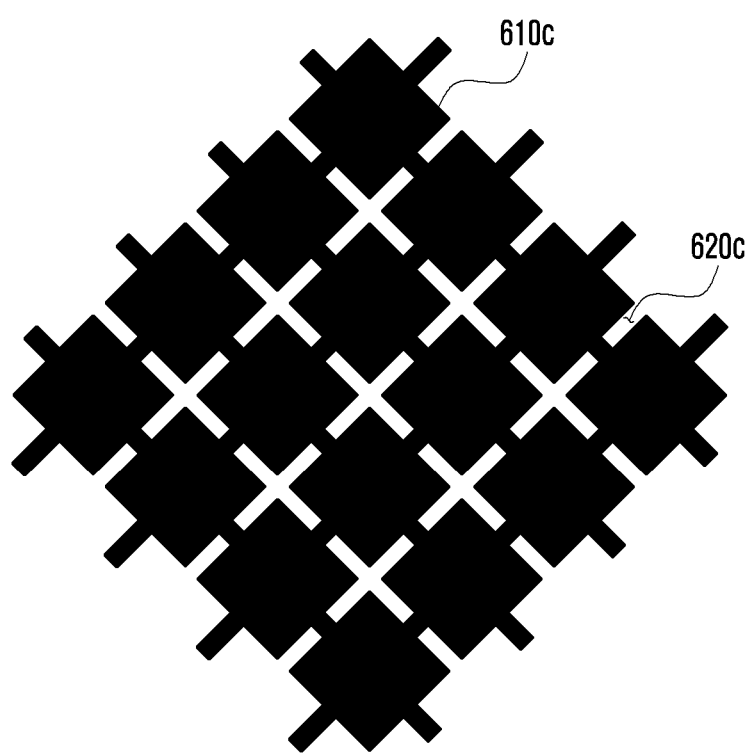

FIGS. 6A to 6C illustrate available forms of an electrode pattern formed in an insulating layer according to a second embodiment.

As illustrated in FIG. 6A, in an electrode pattern according to an embodiment, a protruding region 610a made of an electrode material may have an intersecting form as a straight line, and a grid-shaped slot 620a may be formed between the intersected protruding regions. An embodiment of FIG. 6A may have the effect of a high pass filter (HPF) that passes through only a high frequency of a specific frequency or more.

In an electrode pattern according to another embodiment, as illustrated in FIG. 6B, a protruding region 610b made of an electrode material may be disposed in a grid shape, and a slot 620b may be formed between grids. The embodiment of FIG. 6B may have the effect of a low pass filter (LPF) that passes through only a low frequency. When the electrode pattern is interpreted in a circuit, an inductance L may be generated by a size of the pattern, and capacitance C may be generated by an interval (or the size of the slot region) of each pattern. Therefore, by appropriately adjusting a size of the protruding region of the electrode pattern and a size of the slot region, a resonance frequency of an LPF having the maximum filter effect may be determined.

When an electrode pattern of such an LPF characteristic is used, an electrode pattern may be determined to increase transmittance of radio waves of a target frequency band. For example, when forming an electrode pattern having a resonance frequency of an LPF with a communication band (e.g., 28 GHz band) or more, a transmission loss of the communication band may be reduced, and in radio waves (e.g., infrared band) of a communication band or more, because a transmission loss may increase, the CPE may easily receive radio waves of the communication band.

As illustrated in FIG. 6C, in an electrode pattern according to another embodiment, a form of the protruding region may have a combined form of a pattern of FIG. 6A having an HPF characteristic and a pattern of FIG. 6B having an LPF characteristic. The embodiment of FIG. 6C may have the effect of a band pass filter (BPF) that passes through only radio waves in a specific frequency band.

FIGS. 7A to 7E illustrate electrode patterns formed by combining the electrode patterns of FIG. 6A to 6C.

According to various embodiments, electrode patterns may be formed by a combination of a first pattern formed in an entire region of an electrode layer and a second pattern formed in a partial region of the electrode layer. FIGS. 7A to 7E are an example of an electrode pattern that combine the electrode patterns of FIGS. 6A to 6C and may include various examples that are not illustrated.

Figure 7A:
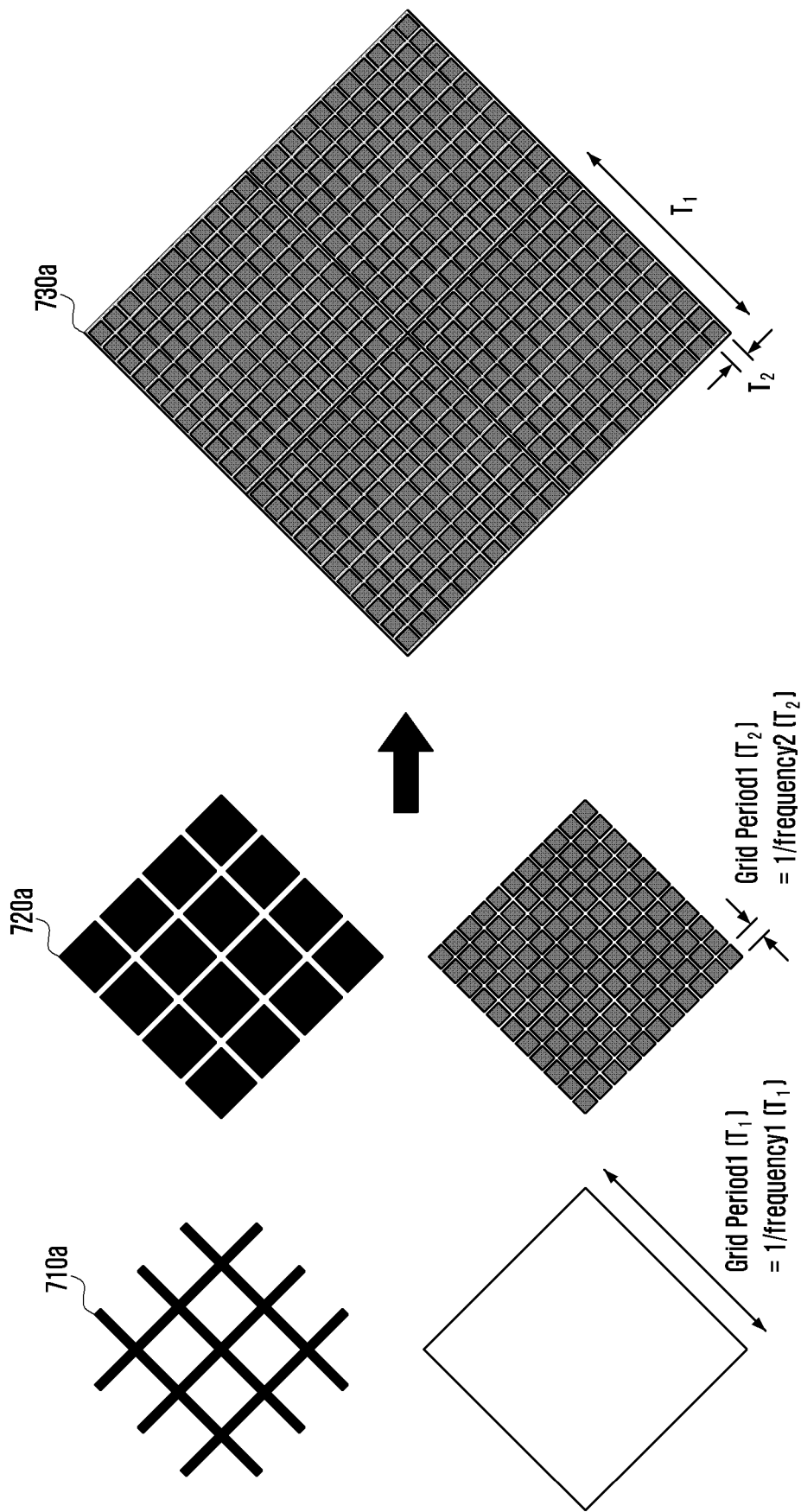
FIGS. 7A to 7E illustrate electrode patterns formed by combining the electrode patterns of FIG. 6A to 6C.

FIG. 7A illustrates a form in which an HPF pattern 710a of FIG. 6 is formed in an entire region of the electrode layer and in which an HPF pattern 720a of FIG. 6B is formed in a partial region. As illustrated in FIG. 7A, the HPF pattern 710a is formed in an entire region, and an LPF pattern is formed in a grid-shaped slot region of the HPF pattern 720a; thus, a protruding region may be formed in a portion within the slot.

Figure 7B:
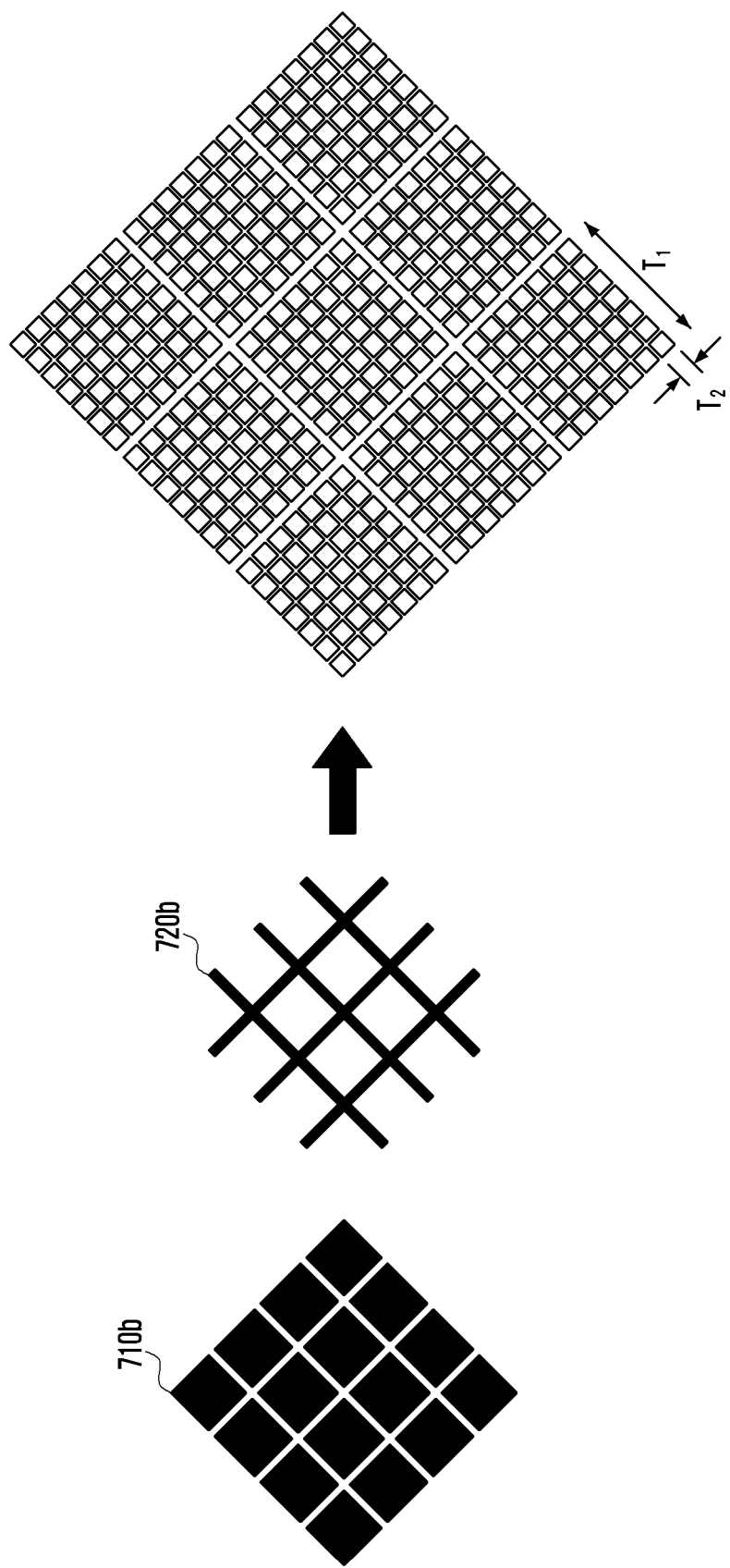

FIG. 7B illustrates a form in which an LPF pattern 710b is formed in an entire region and in which an HPF pattern 720b is formed in a partial region. As illustrated in FIG. 7B, the LPF pattern 710b may be formed in an entire region, and the HPF pattern 720b may be formed in a grid-shaped protruding region of the LPF pattern 710b.

Figure 7C:
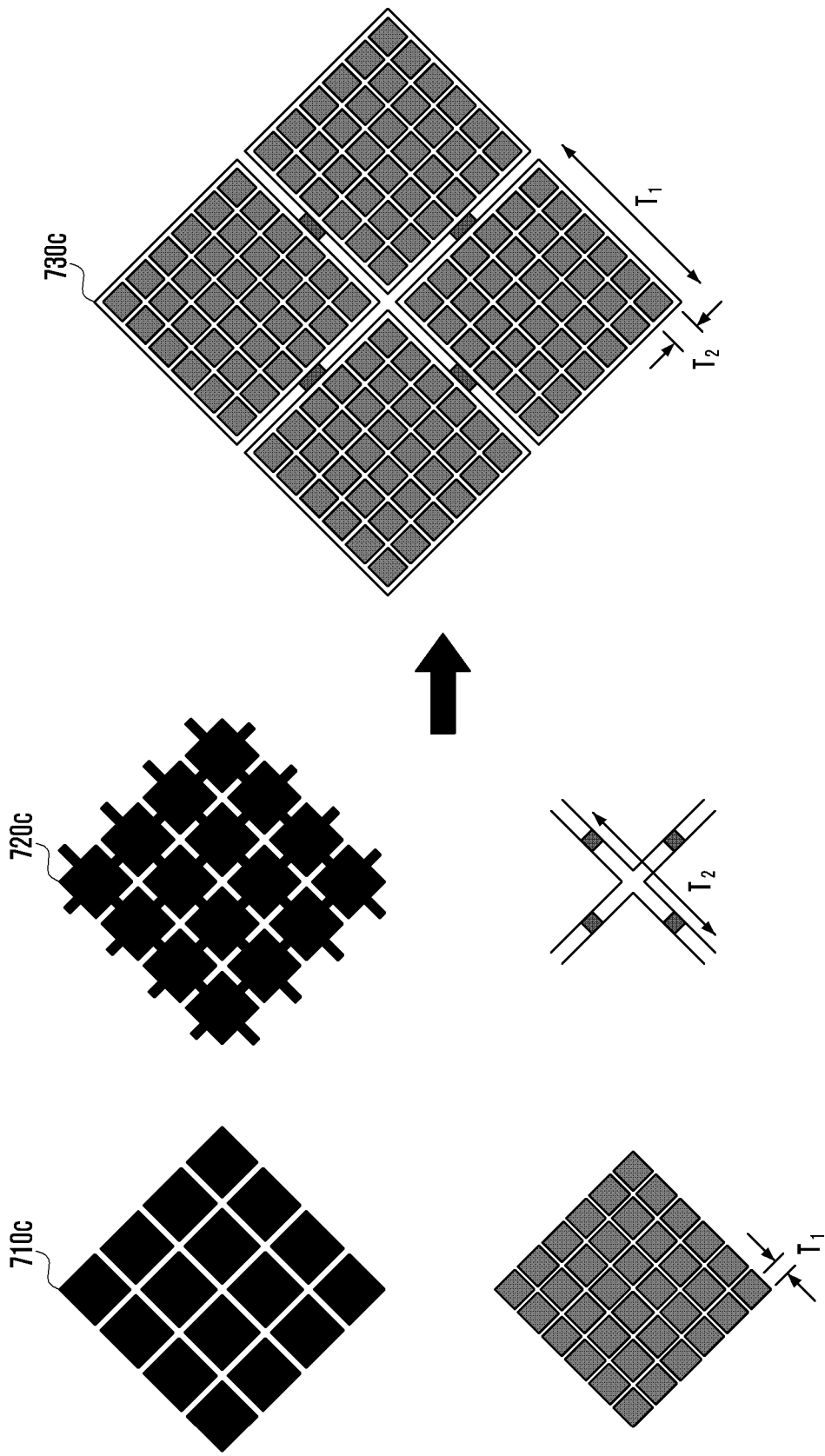

FIG. 7C illustrates an embodiment in which a BPF pattern 710c is formed in an entire region and in which an LPF pattern 720c is formed in a grid-shaped protruding region of the BPF pattern 710c.

Figure 7D:
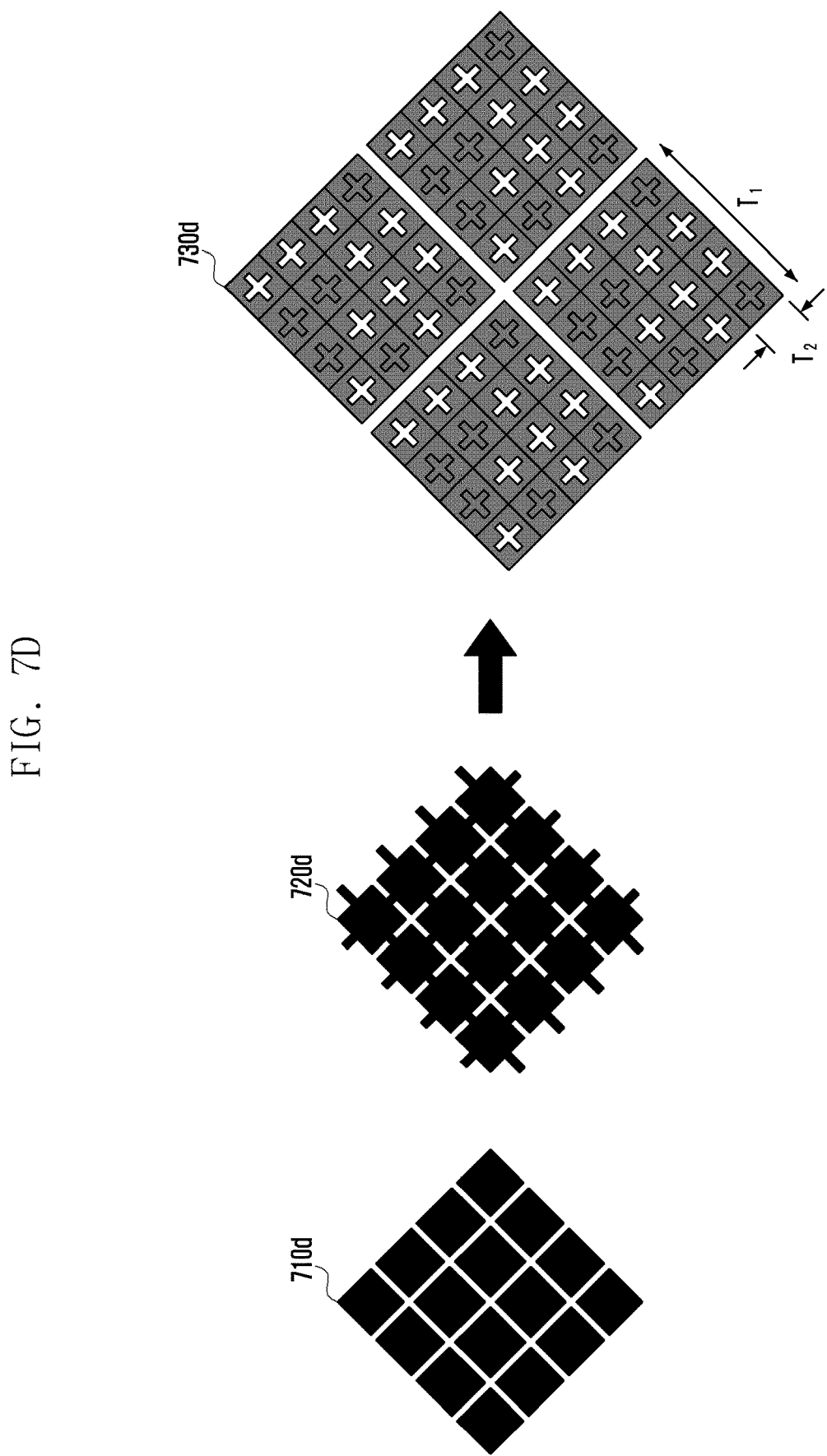

FIG. 7D illustrates an embodiment in which an LPF pattern 710d is formed in an entire region and in which a BPF pattern 720d is formed in a grid-shaped protruding region of the LPF pattern 710d.

Figure 7E:
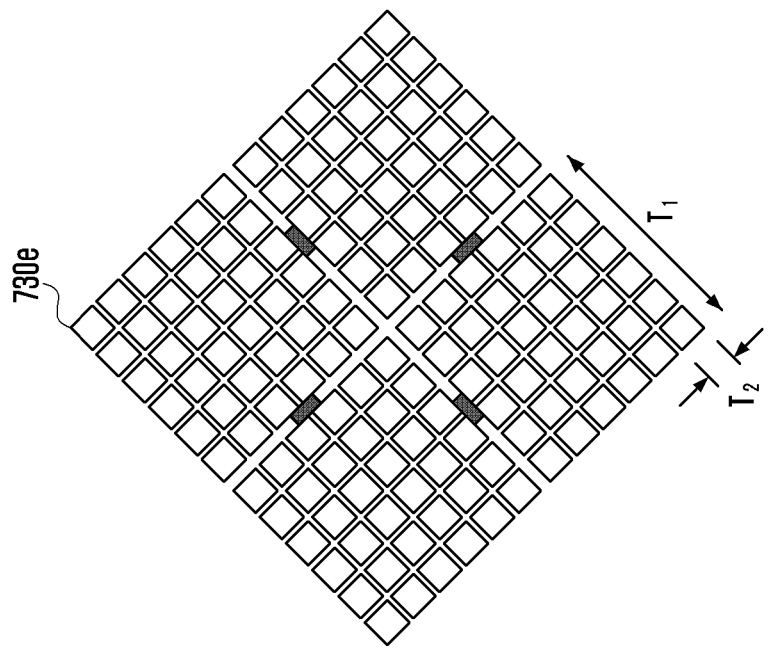
Figure 7E:
Figure 7E:
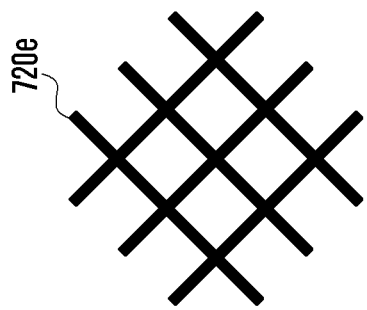
Figure 7E:
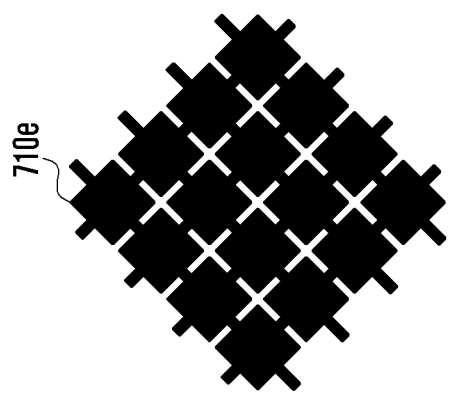

FIG. 7E illustrates an embodiment in which a BPF pattern 710e is formed in an entire region and in which an HPF pattern 720e is formed in a grid-shaped protruding region of the BPF pattern 710e.

FIGS. 6A to 6C and FIGS. 7A to 7E are merely an embodiment of a form of the electrode pattern, and a form of the electrode pattern and a form of a combination thereof may be various. For example, a form of the electrode pattern and required combinations may be determined in consideration of attributes such as a frequency band to be received and a thickness of the window.

Figure 8A:
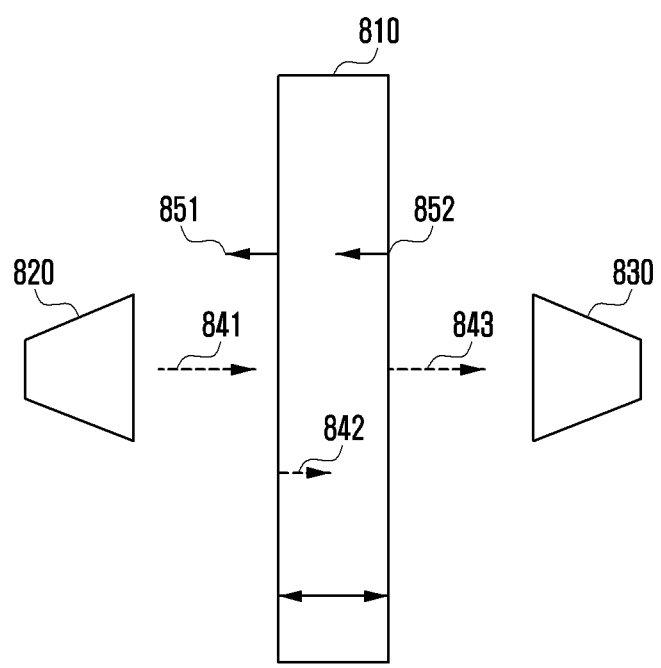
FIGS. 8A to 8C illustrate improved electrode transmittance due to attachment of a film laminate according to a second embodiment.
Figure 8B:
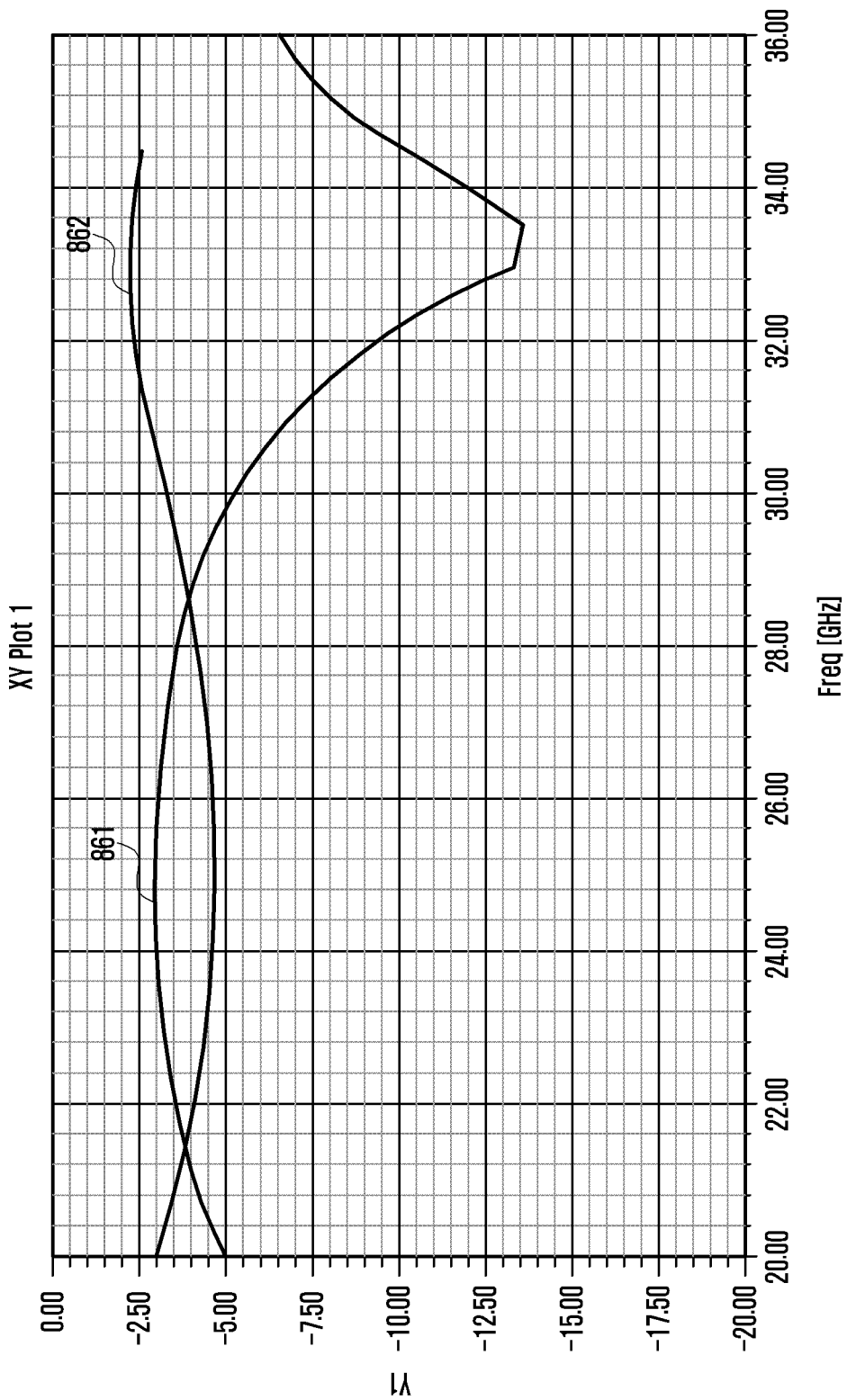
Figure 8C:
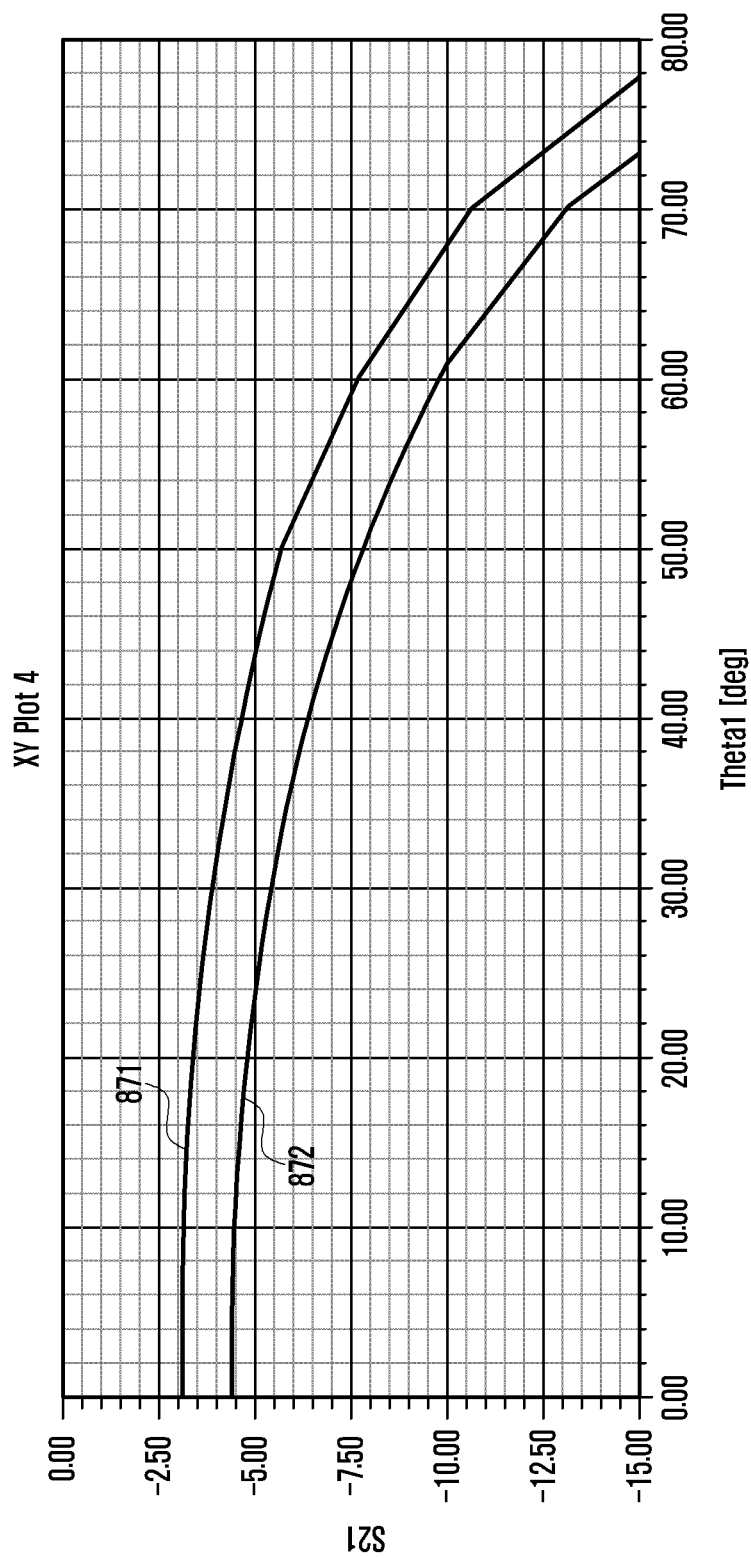

FIGS. 8A to 8C illustrate improved electrode transmittance due to attachment of a film laminate according to a second embodiment.

With reference to FIG. 8A, in radio waves 841 output from a base station 820 to a CPE 830, a propagation loss of some of a component 851 reflected through a first surface of a window 810 and a component 842 that passes through the first surface may occur because of a component 852 reflected at the inside of the window through a second surface of the window.

With reference to FIG. 8B, in radio waves of a particular frequency band (e.g., band of 21 GHz to 29 GHz), a value 861 of S11 (component reflected through a window) may be higher than a value 862 of S21 (component transmitted to the CPE through the window). In particular, in a band 28 GHz, S11 may represent −3.26 dB, and S21 may represent −4.38 dB.

FIG. 8C illustrates a value of the radio wave component S21 transmitted to the CPE according to a phase in a window in which a film laminate is attached and a regular window in which a film laminate is not attached. As illustrated in FIG. 8C, in an entire phase band, it may be determined that transmittance 871 of a window in which a film laminate is attached is higher than that of a regular window 872.

Figure 9A:
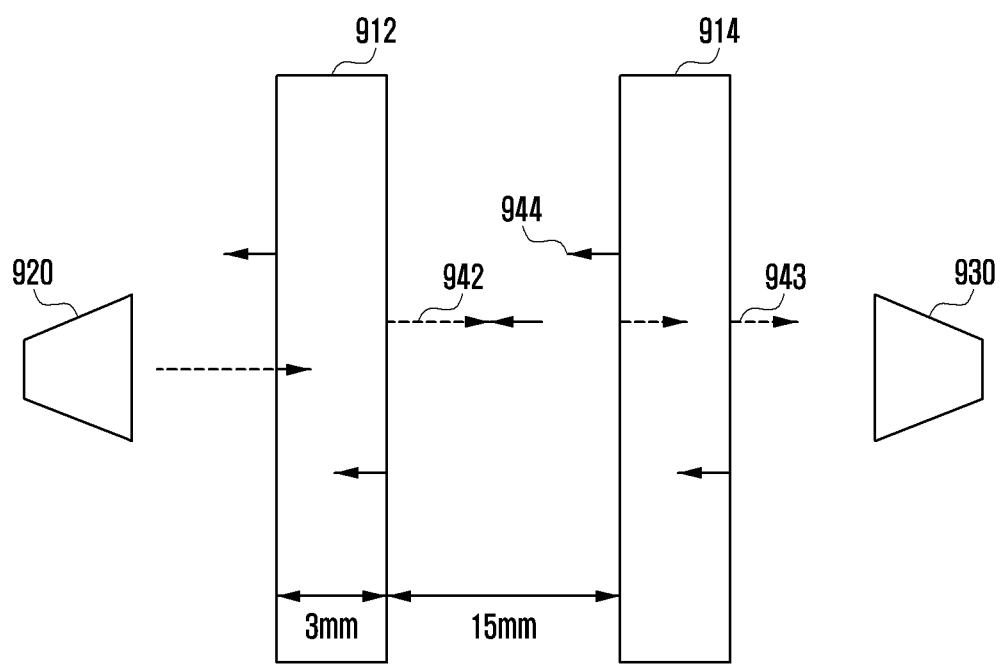
FIGS. 9A and 9B illustrate an example in which a film laminate is attached to a duplex window and enhanced electrode transmittance due to the attached film laminate in a second embodiment.
Figure 9B:
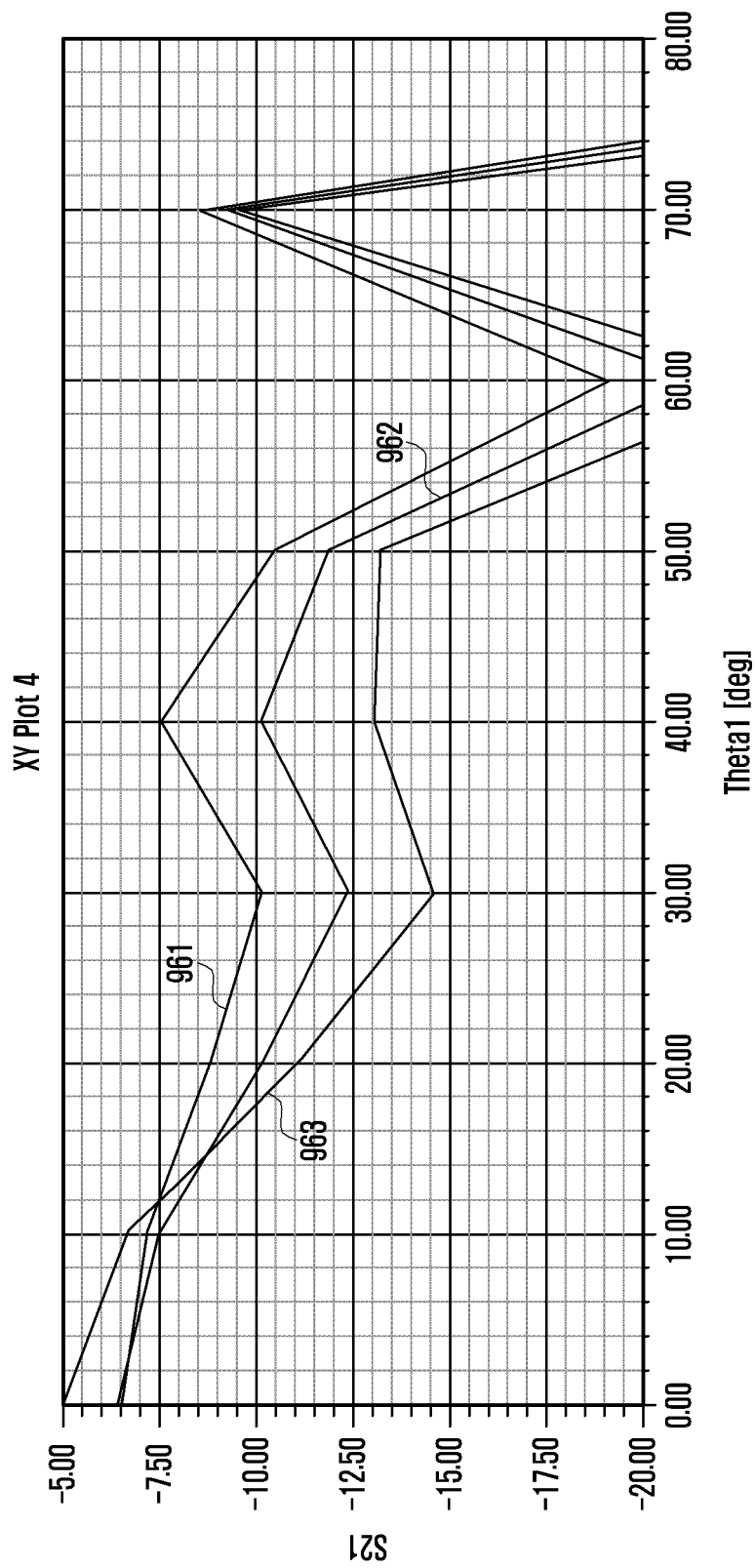

FIGS. 9A and 9B illustrate an example in which a film laminate is attached to a duplex window and enhanced electrode transmittance due to the attached film laminate in a second embodiment.

In a case of a window configured with duplex glass, because permittivity of the glass is high, reflection occurs; thus, only some of radio waves may be transmitted and destructive interference occurs by a signal 941 reflected again at the inside of duplex glass 942, and when an antenna of the CPE is positioned close to the window, performance degradation by reflected waves may also occur 943.

Therefore, according to various embodiments, a window product having duplex glass includes a first window 912 and a second window 914, and a first electrode layer may be bonded to a first window 912, and a second electrode layer may be bonded to a second window 914.

With reference to FIG. 9B, in a window configured with duplex glass, in a case 962 in which a film laminate is attached only to a window of one surface rather than a case 963 in which a film laminate is not attached, a transmission loss is further reduced, and in a case 961 in which film laminates are attached to both windows of both surfaces, it may be determined that a transmission loss is further reduced.

Figure 10:
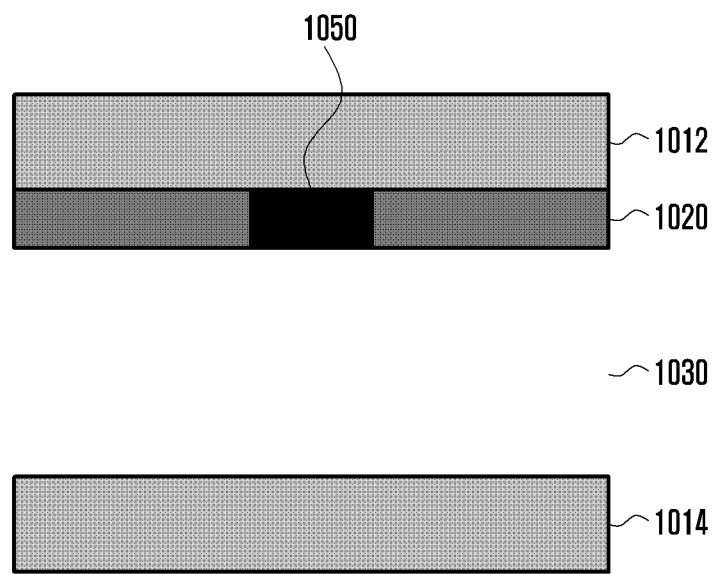
FIG. 10 illustrates a structure of a window according to a third embodiment.

FIG. 10 illustrates a structure of a window according to a third embodiment.

The third embodiment of the present invention relates to a method of forming an electrode pattern in an already produced window and a window product formed by the method. In the present embodiment, the window may be low-emissivity glass including a metal coating layer.

A window product according to the present embodiment includes an insulating layer made of at least one insulation material and a metal coating layer bonded to one surface of the insulating layer, and in order to reduce a transmission loss of radio waves, at least a partial region of the metal coating layer may be removed.

With reference to FIG. 10, a first insulating layer 1012 and a second insulating layer 1014 made of a glass material are provided, and a metal coating layer 1020 may be bonded to one surface of the first insulating layer 1012. An argon (Ar) gas layer 1030 may be formed to increase the insulation effect between the metal coating layer 1020 and the second insulating layer 1014. As described above, low-emissivity glass is much used due to an excellent heat insulating performance, but transmission of radio waves cannot help being disturbed by the metal coating layer 1020.

Therefore, in the window product according to the present invention, by removing 1050 a partial region of the metal coating layer 1020, an electrode pattern may be formed; thus, transmittance of radio waves can be improved. An electrode pattern formed in the metal coating layer 1020 may be substantially the same as the electrode pattern of the second embodiment described with reference to FIGS. 6A to 6C and FIGS. 7A to 7E.

According to the present embodiment, an area of a region protruded by the electrode pattern may be 96% or more of a total area of the metal coating layer 1020. That is, an area of a region 1050 removed from the metal coating layer may be set to less than 4% of a total area. This is to increase transmittance of the radio wave, but is to maintain a heat insulating effect to the maximum.

The film laminate according to a third embodiment may include a film laminate according to the first embodiment described with reference to FIGS. 2A and 2B. The film laminate may be attached to the metal coating layer to serve to compensate reflection of radio waves occurring in a region in which metal coating is formed and/or a region in which metal coating is removed.

Figure 11:
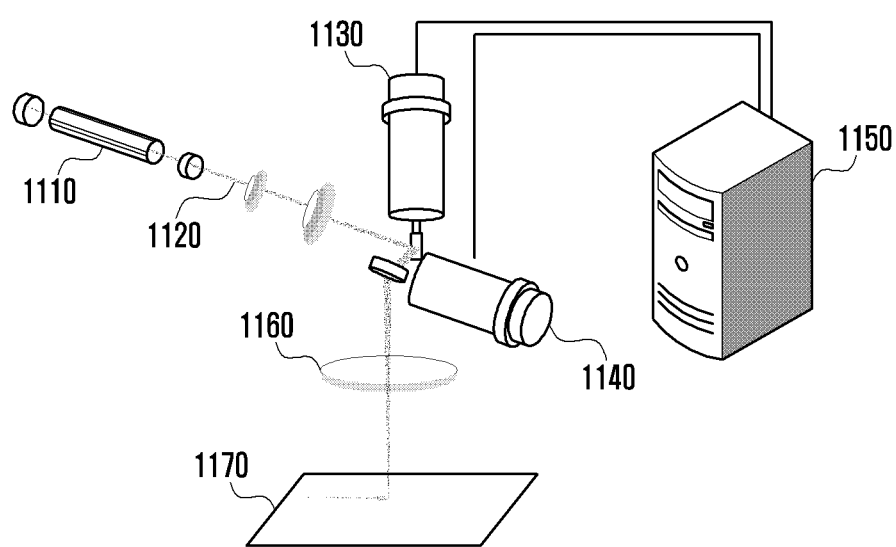
FIG. 11 illustrates laser equipment for forming an electrode pattern of a window according to a third embodiment.

FIG. 11 illustrates laser equipment for forming an electrode pattern of a window according to a third embodiment.

A window product according to the present embodiment may be produced by removing a partial region of a metal coating layer in a previously produced window and may be produced using the laser equipment illustrated in FIG. 11.

As illustrated in FIG. 11, the laser equipment may include a laser cavity 1110 for emitting output laser, a collimator 1120 for passing through the output laser, a flat-field focusing assembly 1160 for shooting laser to an accurate position of the window, a control device 1150 for controlling an output position of laser on the window, and an X-axis galvanometer 1130 and Y-axis galvanometer 1140 for adjusting a quantity of electricity according to a control signal of the control device.

The illustrated laser equipment is only an embodiment, and known other laser equipment may be used for producing a window product according to the present embodiment.

A process of forming an electrode pattern of the window using the laser equipment illustrated in FIG. 11 is described in the following example.

First, a form of an electrode pattern to be formed in a metal coating layer of the window may be set using the control device. Here, the electrode pattern may be formed by a combination of a first pattern formed in an entire region of the metal coating layer and a second pattern formed in a partial region of the metal coating layer and may include a form described with reference to FIGS. 6 and 7.

By outputting laser to the metal coating layer based on format information of an electrode pattern received from the control device, the laser equipment may form an electrode pattern.

According to an embodiment, a film made of an insulation material having permittivity lower than that that of the insulating layer and higher than that of air may be attached to one surface of the metal coating layer.

Figure 12A:
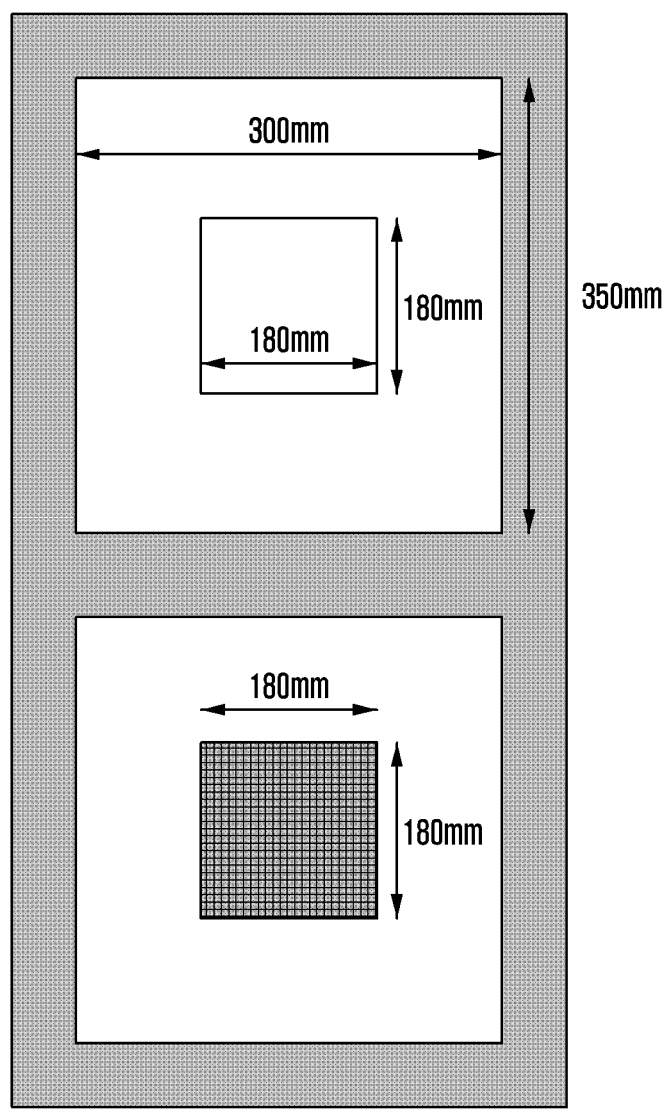
FIGS. 12A and 12B illustrate improved electrode transmittance of a window product in which an electrode pattern is formed according to a third embodiment.
Figure 12B:
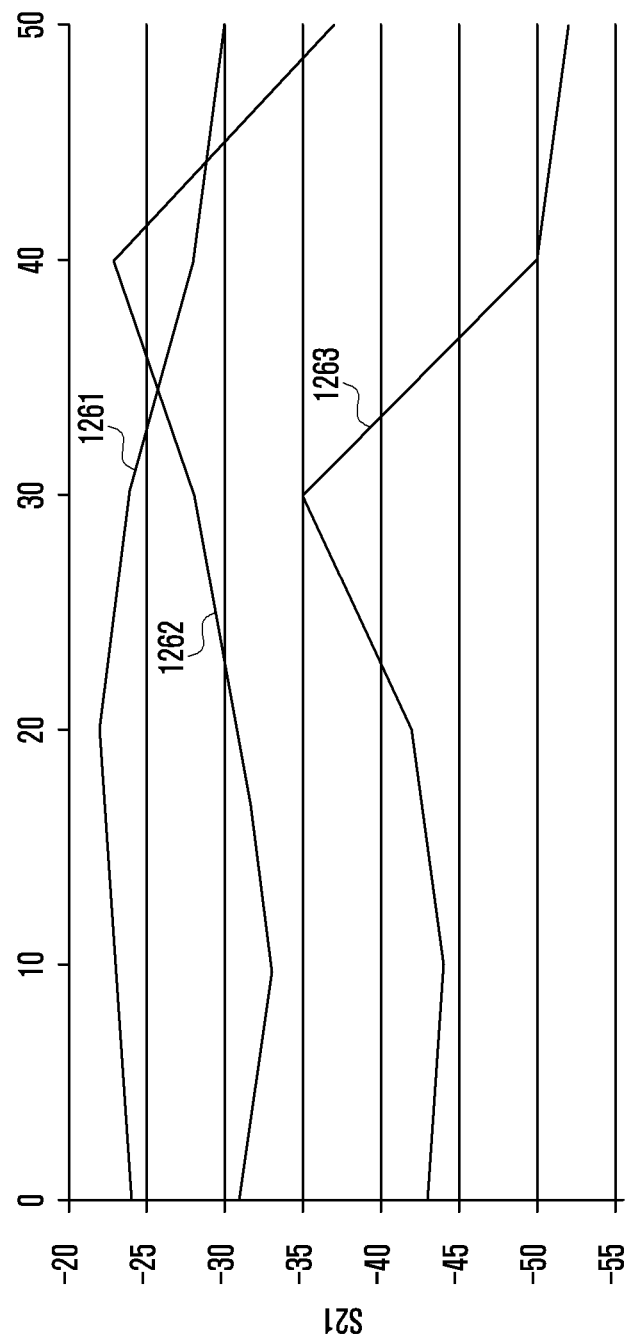

FIGS. 12A and 12B illustrate improved electrode transmittance of a window product in which an electrode pattern is formed according to a third embodiment.

As illustrated in FIG. 12A, in a window having a size of 300 mm*350 mm, an electrode pattern having a size of 180 mm*180 mm was formed and transmittance of radio waves was measured.

As illustrated in FIG. 12B, by rotating the window in several angles, transmittance of each window was measured, it was measured that radio wave transmittance 1263 of a window including low-emissivity glass was lowest, radio wave transmittance 1262 of a window including regular glass was a little higher, and when the window is rotated within a predetermined angle (e.g., 35°), radio wave transmittance 1261 of the window including low-emissivity glass having an electrode pattern was highest.

A window product according to various embodiments of the present invention include a window; and a film made of at least one insulation material and bonded to one surface of the window, wherein permittivity of the insulation material constituting the film is lower than that of the window and is higher than that of air, and wherein the film is configured to reduce a transmission loss of radio waves in the window when the film is attached to the window.

A window product according to various embodiments of the present invention includes an insulating layer made of at least one insulation material; and a metal coating layer bonded to one surface of the insulating layer, wherein at least a partial region of the metal coating layer is removed to reduce a transmission loss of radio waves.

According to various embodiments, the window product may further include a film layer bonded to one surface of the metal coating layer and made of an insulation material having permittivity lower than that of the insulating layer and higher than that of air.

A film according to various embodiments of the present invention includes an insulating layer made of an insulation material; an electrode layer bonded to one surface of the insulating layer and having an electrode pattern made of an electrode material in at least a partial region of one surface different from a surface bonded to the insulating layer, wherein the electrode pattern of the electrode layer is formed to reduce a transmission loss of radio waves in the window when the film is attached to the window.

According to various embodiments, the electrode pattern formed in the electrode layer may be formed by a combination of a first pattern formed in an entire region of the electrode layer and a second pattern formed in a partial region of the electrode layer.

According to various embodiments, the electrode pattern formed in the electrode layer may include a plurality of protruding regions electrically separated and a slot region provided between the plurality of protruding regions, and the plurality of protruding regions may be mutually electrically isolated.

A window product according to various embodiments of the present invention includes an insulating layer made of an insulation material; at least one electrode layer bonded to one surface of the insulating layer and having an electrode pattern made of an electrode material in at least a partial region of one surface different from a surface bonded to the insulating layer; and at least one window, wherein the electrode pattern of the electrode layer is formed to reduce a transmission loss of radio waves in the at least one window.

According to various embodiments, the electrode pattern formed in the electrode layer may be formed by a combination of a first pattern formed in an entire region of the electrode layer and a second pattern formed in a partial region of the electrode layer.

According to various embodiments, the electrode pattern formed in the electrode layer may include a plurality of protruding regions electrically separated and a slot region provided between the plurality of protruding regions, and the plurality of protruding regions may be mutually electrically isolated.

According to various embodiments, the electrode material constituting the electrode pattern may have transparency of 80% or more.

According to various embodiments, an area of a region protruded by the electrode pattern in the electrode layer may be 96% or more of a total area of the electrode layer.

According to various embodiments, the at least one electrode layer may include a first electrode layer and a second electrode layer, the at least one window may include a first window and a second window, and the first electrode layer may be bonded to one surface of the first window, and the second electrode layer may be bonded to one surface of the second window.

According to various embodiments, the window may include low-emissivity glass including at least one metal coating layer.

A method of forming an electrode pattern in a window according to various embodiments of the present invention, wherein the window includes an insulating layer made of an insulation material and a metal coating layer bonded to one surface of the insulating layer, wherein the method includes operation of setting a form of the electrode pattern by using a control device; and operation of forming an electrode pattern in the metal coating layer by outputting laser from the laser equipment based on the form of the electrode pattern, wherein the electrode pattern is formed by a combination of a first pattern formed in an entire region of the metal coating layer and a second pattern formed in a partial region of the metal coating layer, and a transmission loss of radio waves in the window may be reduced by the electrode pattern.

According to various embodiments, the method may further include operation of attaching a film made of an insulation material having permittivity lower than that of the insulating layer and higher than that of air to one surface of the metal coating layer.

The invention claimed is:

1. A window product, comprising:
    an insulating layer made of at least one insulation material;
    a metal coating layer bonded to at least a partial region of an inner surface of the insulating layer; and
    an argon gas layer disposed between the metal coating layer and an additional insulation layer,
    wherein at least a partial region of the metal coating layer is removed to form an electrode layer including an electrode pattern,
    wherein the electrode pattern comprises a first pattern and a second pattern, each of the first pattern and the second pattern comprises a plurality of protruding regions electrically separated and a slot region provided between the plurality of protruding regions,
    wherein the electrode pattern is formed by a combination of the first pattern formed in an entire region of the electrode layer and the second pattern formed in the slot region of the first pattern, and
    wherein the plurality of protruding regions are physically and electrically separated by the slot region.

2. The window product of claim 1, further comprising a film layer bonded to at least a partial region of a surface of the metal coating layer and made of an insulation material having permittivity lower than that of the insulating layer and higher than that of air.

3. A film, comprising:
an insulating layer made of an insulation material; and
an electrode layer bonded to at least a partial region of one surface of the insulating layer and having an electrode pattern made of an electrode material in at least a partial region of one surface different from a surface bonded to the insulating layer,
wherein the electrode pattern comprises a first pattern and a second pattern, each of the first pattern and the second pattern comprises a plurality of protruding regions electrically separated and a slot region provided between the plurality of protruding regions,
wherein the electrode pattern is formed by a combination of the first pattern formed in an entire region of the electrode layer and the second pattern formed in the slot region of the first pattern, and
wherein the plurality of protruding regions are physically and electrically separated by the slot region.

4. The film of claim 3, wherein the plurality of protruding regions of the first pattern are intersected in a line, and the plurality of protruding regions of the second pattern are disposed in a grid shape.

5. The film of claim 3, wherein the electrode material constituting the electrode pattern has transparency of 80% or more.

6. A window product, comprising:
an insulating layer made of an insulation material;
at least one electrode layer bonded to at least a partial region of an outer surface of the insulating layer and having an electrode pattern made of an electrode material in at least a partial region of one surface different from a surface bonded to the insulating layer; and
at least one window,
wherein the electrode pattern of the electrode layer comprises a first pattern and a second pattern, each of the first pattern and the second pattern comprises a plurality of protruding regions electrically separated and a slot region provided between the plurality of protruding regions, the plurality of protruding regions of the first pattern are intersected in a line, and the plurality of protruding regions of the second pattern are disposed in a grid shape,
wherein the electrode pattern is formed by a combination of the first pattern formed in an entire region of the electrode layer and the second pattern formed in the slot region of the first pattern, and
wherein the plurality of protruding regions are physically and electrically separated by the slot region.

7. The window product of claim 6, wherein the electrode material constituting the electrode pattern has transparency of 80% or more.

8. The window product of claim 6, wherein an area of a region protruded by the electrode pattern in the electrode layer is 96% or more of a total area of the electrode layer.

9. The window product of claim 6,
wherein the at least one electrode layer comprises a first electrode layer and a second electrode layer,
wherein the at least one window comprises a first window and a second window, and
wherein the first electrode layer is bonded to at least a partial region of one surface of the first window, and the second electrode layer is bonded to at least a partial region of one surface of the second window.

10. The window product of claim 6, wherein the window comprises low-emissivity glass comprising at least one metal coating layer.

11. The window product of claim 2, wherein permittivity of the film layer is 2 to 4 F/m.

12. The film of claim 3, wherein thickness of the insulating layer is 125 to 200 μm.

13. The film of claim 3, wherein thickness of the electrode pattern is 8 to 20 μm.

14. The window product of claim 1, wherein the plurality of protruding regions of the first pattern are intersected in a line, and the plurality of protruding regions of the second pattern are disposed in a grid shape.

15. The film of 3, wherein thickness of the electrode pattern is determined according to thickness of a window.

* * * * *